(12) United States Patent
Rose (10) Patent No.: US 11,556,151 B2
(45) Date of Patent: Jan. 17, 2023

(54) REMOVABLE TABLET COMPUTING SYSTEM

(71) Applicant: Lenovo (Singapore) Pte. Ltd., Singapore (SG)

(72) Inventor: Alden Rose, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 16/915,823

(22) Filed: Jun. 29, 2020

(65) Prior Publication Data

US 2021/0405705 A1  Dec. 30, 2021

(51) Int. Cl.
| | |
|---|---|
| *G06F 1/16* | (2006.01) |
| *G06F 3/044* | (2006.01) |
| *H02J 7/02* | (2016.01) |
| *H02J 50/10* | (2016.01) |

(52) U.S. Cl.
CPC .......... *G06F 1/1656* (2013.01); *G06F 1/1616* (2013.01); *G06F 1/1626* (2013.01); *G06F 1/1635* (2013.01); *G06F 1/1637* (2013.01); *G06F 1/1662* (2013.01); *G06F 1/1681* (2013.01); *G06F 3/044* (2013.01); *H02J 7/02* (2013.01); *H02J 50/10* (2016.02)

(58) Field of Classification Search
CPC .... G06F 1/1654; G06F 1/1656; G06F 1/1616; G06F 1/1626; G06F 1/1632; G06F 1/1635; G06F 1/1637; G06F 1/1662; G06F 1/1681; G06F 1/1649; G06F 1/1647; G06F 3/044; G06F 3/041; G06F 3/045; G06F 3/1454; G06F 3/1423; G06F 13/102; H02J 50/10; H02J 7/02
USPC .................................................. 361/679.09
See application file for complete search history.

(56) References Cited

U.S. PATENT DOCUMENTS

| | | | | |
|---|---|---|---|---|
| 6,532,146 B1* | 3/2003 | Duquette | ............... | G06F 1/1607 361/679.04 |
| 6,538,880 B1* | 3/2003 | Kamijo | .................. | G06F 1/1632 248/65 |
| 8,504,123 B1* | 8/2013 | Choi | .................. | H04W 52/0229 455/574 |
| 10,817,020 B1* | 10/2020 | DeMaio | ................. | G06F 3/1423 |
| 2003/0080952 A1* | 5/2003 | Chitturi | .................. | G06F 1/1632 345/204 |
| 2006/0082518 A1* | 4/2006 | Ram | ..................... | G06F 3/1446 345/1.1 |

(Continued)

OTHER PUBLICATIONS

Ultrapolymers, Lommel, Belgium, Brochure, Transparent Plastics, 421049-Transparent-Plastics-Jan. 2014, Jan. 2014 (20 pages).

(Continued)

*Primary Examiner* — Adrian S Wilson
*Assistant Examiner* — Gage Crum
(74) *Attorney, Agent, or Firm* — Brian J. Pangrle (57) ABSTRACT

A system can include a tablet computer that includes a tablet display; and a clamshell computer that includes a keyboard housing, a display housing and a hinge assembly that rotatably couples the keyboard housing and the display (Continued)

housing, where the display housing includes a display viewable via a display side, an opposing back side, and a tablet computer recess disposed between the display side and the back side that removably receives the tablet computer.

19 Claims, 6 Drawing Sheets

(56) References Cited

U.S. PATENT DOCUMENTS

| | | | | |
|---|---|---|---|---|
| 2008/0297433 | A1* | 12/2008 | Heller | G06F 1/1616 |
| | | | | 345/2.1 |
| 2009/0267866 | A1* | 10/2009 | Reddy | G06F 3/1431 |
| | | | | 345/1.1 |
| 2012/0075204 | A1* | 3/2012 | Murray | G06F 9/452 |
| | | | | 370/312 |
| 2013/0342638 | A1* | 12/2013 | Sobti | G06F 1/1698 |
| | | | | 455/575.1 |
| 2015/0022458 | A1* | 1/2015 | Kelso | G06F 3/03545 |
| | | | | 345/173 |
| 2015/0092329 | A1* | 4/2015 | Balasundaram | G06F 1/1616 |
| | | | | 361/679.09 |
| 2015/0278534 | A1* | 10/2015 | Thiyagarajan | G06F 21/84 |
| | | | | 726/28 |
| 2015/0347738 | A1* | 12/2015 | Ulrich | G06F 21/35 |
| | | | | 726/17 |
| 2016/0094691 | A1* | 3/2016 | Okuley | G06F 1/1632 |
| | | | | 455/575.1 |
| 2016/0180805 | A1* | 6/2016 | Konanur | G09G 5/006 |
| | | | | 345/520 |
| 2016/0241076 | A1* | 8/2016 | Bowers | G06F 3/0231 |
| 2018/0107253 | A1* | 4/2018 | Landwehr | G06F 1/1681 |
| 2019/0332146 | A1* | 10/2019 | Yao | G06F 1/1683 |
| 2020/0409645 | A1* | 12/2020 | Clark | G06F 3/1423 |

OTHER PUBLICATIONS

Unisystem, Gdansk, Poland, Glass thickness and capacitive touch screens, 1995-2020, accessed Jun. 21, 2020 https://www.unisystem-displays.com/en/news/capacitive-glass-thickness.html) (4 pages).

Capella, F., Transparency in plastics, Jan. 11, 1997, accessed Jun. 29, 2020 (https://www.interempresas.net/Plastico/Articulos/5544-La-transparencia-en-los-plasticos html) (8 pages).

Crolly, G., Fristsch GmbH, Idar-Oberstein, Germany, Optical characteristics of transparent and opaque materials—influence of the particle size, Jan. 2013 (1 page).

Protective Industrial Products, Inc., Gloves & Touchscreen Compatibility, Jul. 2017 (5 pages).

Koch, M.A., The Feasibility of measuring keyboard forces during a typing task to determine the efficacy of physical therapy on patients with known musculoskeletal hand and wrist disorders, RESNA 27th International Annual Conference, Jun. 18-22, 2004, Orlando, Florida (6 pages).

Scientific American, What determines whether a substance is transparent? Oct. 21, 1999 (https://www.scientificamerican.com/article/what-determines-whether-a/) accessed Jun. 21, 2020 (6 pages).

* cited by examiner

REMOVABLE TABLET COMPUTING SYSTEM

TECHNICAL FIELD

Subject matter disclosed herein generally relates to technology for computing systems.

BACKGROUND

Various types of display devices, display systems, computing systems with a display, etc., exist that can be utilized in various environments.

SUMMARY

A system can include a tablet computer that includes a tablet display; and a clamshell computer that includes a keyboard housing, a display housing and a hinge assembly that rotatably couples the keyboard housing and the display housing, where the display housing includes a display viewable via a display side, an opposing back side, and a tablet computer recess disposed between the display side and the back side that removably receives the tablet computer. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
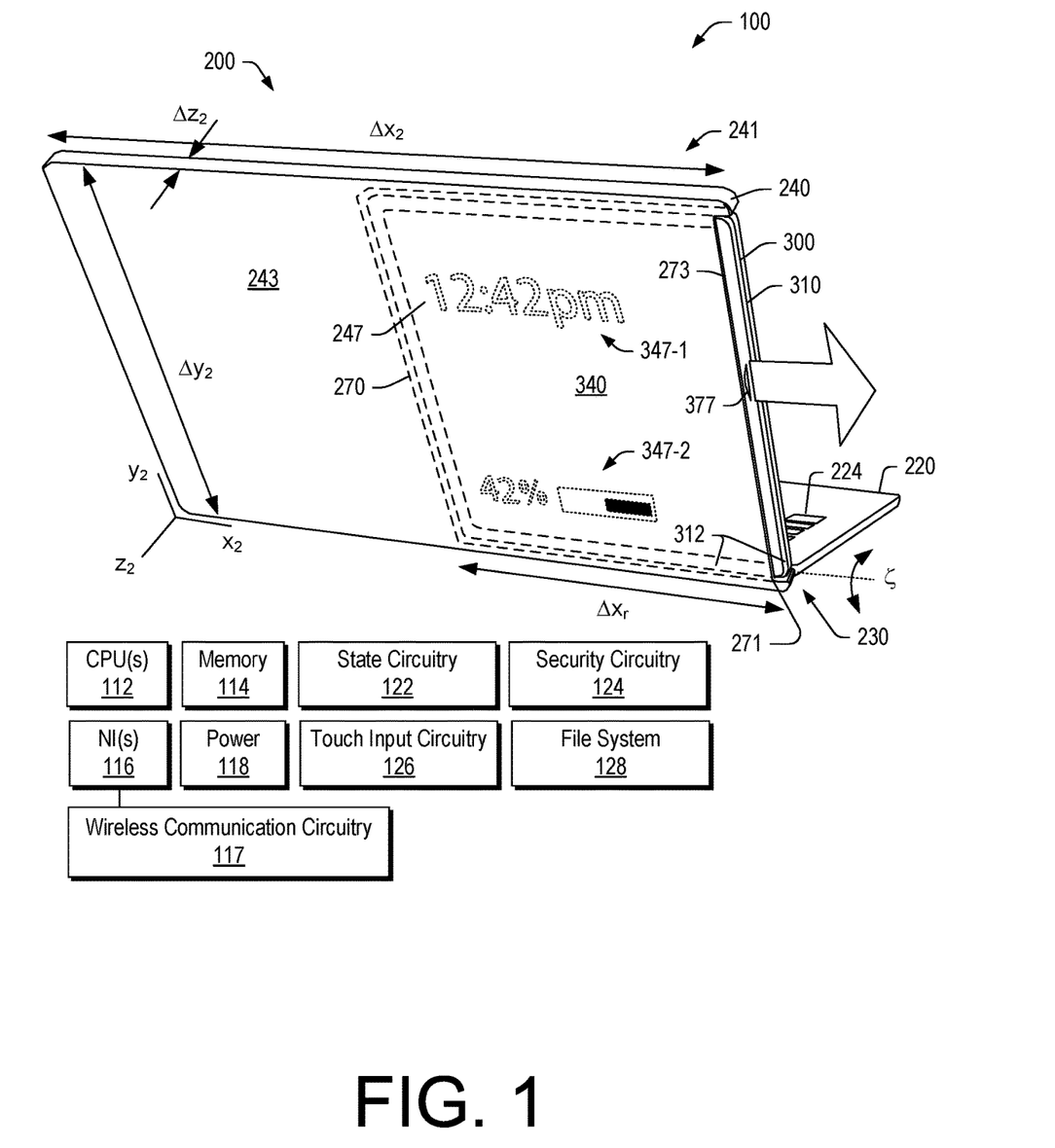
FIG. 1 is a diagram of an example of a system.

FIG. 1 shows an example of a system 100 that includes a tablet computer 300 that includes a tablet display 300; and a clamshell computer 200 that includes a keyboard housing 220, a display housing 240, and a hinge assembly 230 that rotatably couples the keyboard housing 220 and the display housing 240, where the display housing includes a display viewable via a display side 241, an opposing back side 243, and a tablet computer recess 270 disposed between the display side 241 and the back side 243 that removably receives the tablet computer 300.

In the example of FIG. 1, the hinge assembly 230 rotatably couples the keyboard housing 220 and the display housing 240 for rotation about a rotational axis C. A hinge assembly may include one or more hinges, one or more axles, one or more leaves, one or more gears, etc. For example, consider a single axle hinge that includes a leaf that couples to the keyboard housing 220 and a leaf that couples to the display housing 240. As another example, consider a multi-axle hinge that can include gears where axles rotate in unison via meshed engagement of gears. As an example, a hinge assembly can include a swivel hinge that allows for swiveling of one housing with respect to another housing. For example, consider a single central hinge assembly that provides for rotation and swiveling. In such an example, the display housing 240 may be swiveled by 180 degrees about a central axis of the central hinge assembly and then rotated to be stacked against the keyboard housing 220, which may be a closed clamshell orientation. In such a closed clamshell orientation, the display side 241 may face outwardly or may face inwardly, for example, toward keys of a keyboard 224 of the keyboard housing 220.

As an example, the system 100 may include one or more processors 112, memory 114 (e.g., one or more memory devices), one or more network interfaces 116 that can include wireless communication circuitry 117, one or more power cells 118, state circuitry 122, security circuitry 124, touch input circuitry 126 and a file system 128. Such components may be, for example, housed in one or more of the keyboard housing 220, the display housing 240, and the tablet computer 300.

In the example of FIG. 1, the tablet computer 300 can be independently operable, for example, for access to one or more networks (e.g., the Internet, etc.) for accessing content and rendering accessed content to a display 340 of the tablet computer 300. The tablet computer 300 can include one or more memory devices, optionally one or more removable memory devices (e.g., consider a memory card that can be removably received by a memory card slot accessible via an outer surface of the tablet computer 300). In such an example, the tablet computer 300 may render content using information stored in a memory device of the tablet computer 300.

The tablet computer 300 can include one or more power cells, such as, for example, one or more rechargeable batteries (e.g., lithium-ion based, etc.). As an example, the clamshell computer 200 may include charging circuitry that provides for charging of a rechargeable battery of the tablet computer 300. In such an example, the charging circuitry may be wired and/or wireless (e.g., consider antenna based charging circuitry, which may adhere to the Qi standard that defines wireless power transfer using inductive charging over distances that may range up to 4 cm or more).

As an example, the tablet computer 300 can include an interface that provides for one or more of power transfer and data transfer with the clamshell computer 200. For example, consider an interface disposed within the tablet computer recess 270 that operatively couples with an interface of the tablet computer 300. As an example, compatible interfaces may operate via wireless transfer of data, for example, consider one or more of WiFi, LiFi, etc.

In the example of FIG. 1, the back side 243 of the display housing 240 includes a translucent surface 247 that provides for viewing of content rendered to the display 340 of the tablet computer 300 when the tablet computer 300 is received in the tablet computer recess 270 of the display housing 240. As shown, such content may include, for example, a time 347-1, equipment information 347-2, etc. In the example of FIG. 1, the equipment information 347-2 can include power status (e.g., battery charge level, power state, etc.), network status (e.g., WiFi connection, cellular connection, etc.), etc. As an example, the computer tablet 300 may render information to the display 340 responsive to receipt of information via one or more interfaces. For example, consider receipt of an email, a network call, a message, an alarm, etc.

Figure 2:
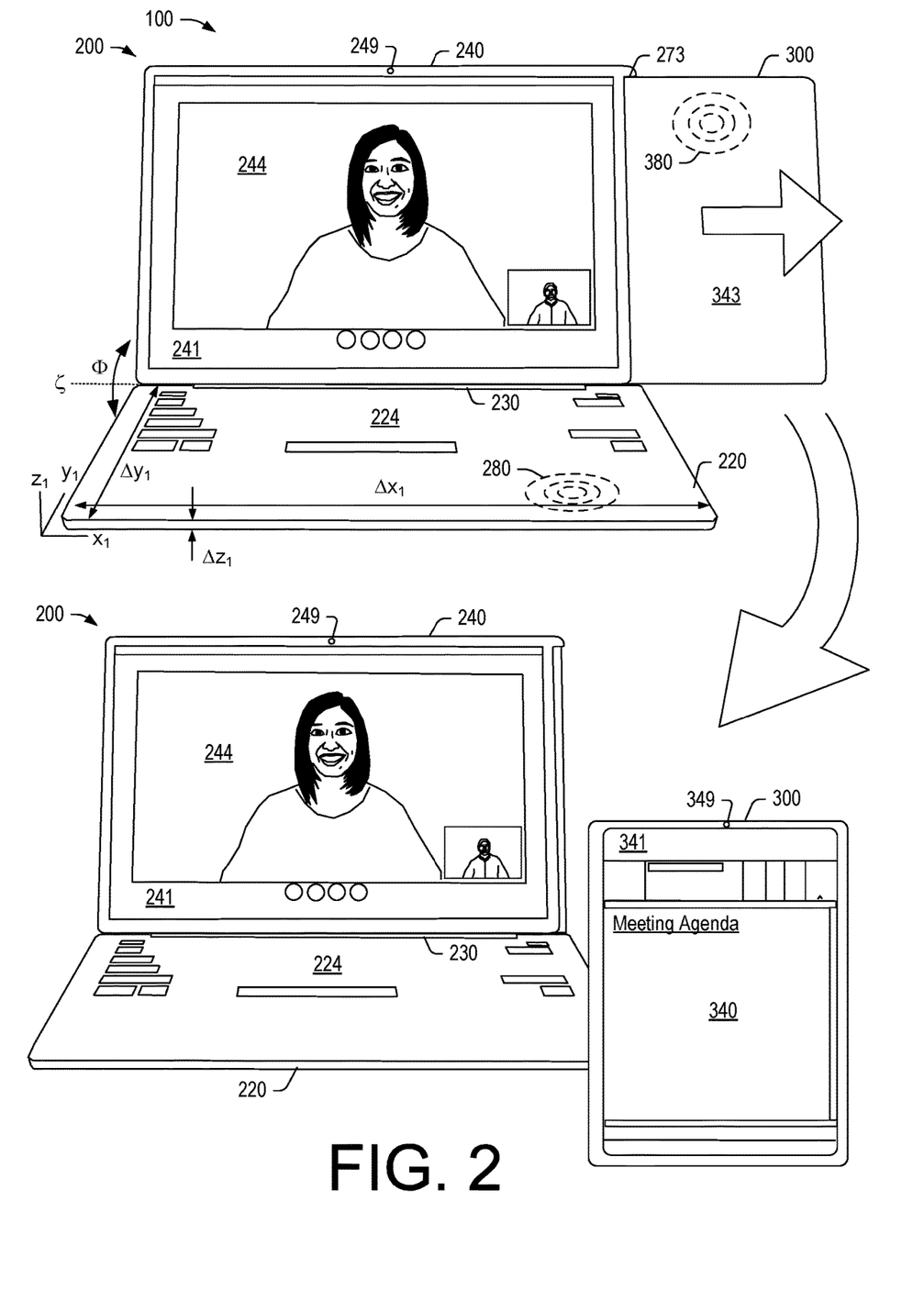
FIG. 2 is a diagram of an example of a method and an example of a system.

In the example of FIG. 1, various dimensions are shown with respect to a Cartesian coordinate system ($x_2$, $y_2$, $z_2$) for the display housing 240; noting that a similar Cartesian coordinate system may be utilized for the keyboard housing 220 (see, e.g., Cartesian coordinate system ($x_1$, $y_1$, $z_1$) of FIG. 2). As shown, the axis $x_2$ can be utilized to define a width $\Delta x_2$, the axis $y_2$ can be utilized to define a depth $\Delta y_2$, and the axis $z_2$ can be utilized to define a thickness $\Delta z_2$. The dimensions $\Delta x_2$ and $\Delta y_2$ can define an area, for example, a surface area of the back side 243 of the display housing 240 (e.g., $a_2 = \Delta x_2 * \Delta y_2$).

As shown, the tablet computer recess 270 can be defined in part by a width $\Delta x_r$, which is less than $\Delta x_2$. As shown, a portion of the tablet computer 300 may be exposed when received in the tablet computer recess 270, which may facilitate removal of the tablet computer 300. For example, consider an exposed portion that can be at an edge or other portion where a user may utilize a finger, a fingertip, a fingernail, etc., to translate the tablet computer 300 at least partially out of the tablet computer recess 270. In the example of FIG. 1, the tablet computer 300 is shown as optionally including a groove 377, which may be exposed when the tablet computer 300 is in a stored state in the tablet computer recess 270. As an example, an opening in the back side 243 may provide for access to the groove 377 or another feature that can allow a user to touch and translate the tablet computer 300. As another example, the display housing 240 may include a mechanical, spring-loaded, electrical, magnetic, etc., mechanism that can facilitate storing and removing the tablet computer 300. As an example, a push to eject type of mechanism may be utilized where a user may push an edge of the tablet computer 300 to translate the tablet computer 300 slightly inwardly to release a spring-loaded pusher that causes the tablet computer 300 to translate outwardly. In such an example, a latch may be released where the latch acts to retain the tablet computer 300 in the tablet computer recess 270 when in a stored state.

As mentioned, one or more magnets may be utilized to provide a magnetic attraction force, which may act to retain the tablet computer 300 in the tablet computer recess 270. In such an example, the magnetic attraction force may be overcome, for example, via a user contacting a portion of the tablet computer 300 to translate it outwardly from the tablet computer recess 270.

As an example, the tablet computer recess 270 can include one or more guides, such as an edge guide 271, that can guide an edge or edges 312 of a rectangular frame 310 of the tablet computer 300 for translation into and out of the tablet computer recess 270. In such an example, a guide may be a slot that can provide an interference fit with a portion of the tablet computer 300. In such an example, the interference fit can provide a frictional force that can overcome a gravitation force of a mass of the tablet computer 300. For example, if the display housing 240 is oriented with an open end 273 of the tablet computer recess 270 downwardly in a direction of the acceleration of gravity, a force can act upon the tablet computer 300 that depends on the mass of the tablet computer (e.g., F=mg) where such a force may act to cause the tablet computer 300 to translate downwardly out of the tablet computer recess 270. To avoid undesirable translation, one or more forces may be provided that can be individually or collectively greater than a gravity related force. Such force or forces can include frictional force, magnetic force (e.g., attraction and/or repulsion), mechanical (e.g., a latch, etc.), etc.

As mentioned, the back side 243 of the display housing 240 can include a translucent surface 247 that provides for viewing of content rendered to the display 340 of the tablet computer 300 when the tablet computer 300 is received in the tablet computer recess 270 of the display housing 240. Such a translucent surface may be contiguous or, for example, a plurality of translucent surfaces may be provided.

As an example, a translucent surface may appear to the human eye as being transparent. A material may appear to the human eye to be transparent if processes that compete with transmission, either by absorbing the light or by scattering it in other directions are relatively negligible. In pure silicon, there is a very strong absorptive process at work: the incident visible light is absorbed by electrons that then move from one electron energy state to another (an occurrence technically known as a band-to-band transition). Glass, being silicon dioxide, rather than pure silicon, lacks such a band structure such that it does not absorb light as does pure silicon. Sand also includes silicon dioxide but with impurities such that light scatters outward incoherently. Transparency, as 100 percent transparent, can be a theoretical concept that can depend on wavelength. For example, optical glass may be 99.99 percent transparent or higher using multi-layer anti-reflective coatings; however, they may be limited in viewing angle. As 100 percent transparent is not readily achievable through use of a material, a translucent material can be defined to be a material that is up to 99.999 percent transparent. An opposite physical property of translucency is opacity.

A translucent surface can be a surface of a translucent material that allows a viewer to comprehend content rendered to the display 340 of the tablet computer 300 when the tablet computer 300 is received in the tablet computer recess 270 of the display housing 240. A translucent material can be a glass, a polymeric material, a ceramic material or another type of material.

As an example, a polymeric material may include one or more types of polymers. For example, consider ethylene tetrafluoroethylene (ETFE) (e.g., approximately 95 percent light transmission), polymethylmethacrylate (PMMA) (e.g., approximately 92 percent light transmission), polystyrene (e.g., approximately 90 percent light transmission or more), polycarbonate, (e.g., approximately 80 percent to 90 percent light transmission), etc.

As an example, a material may be finished mechanically, chemically, with a film, etc., to provide a desired amount of transmission and/or diffusion. For example, consider a matte type of finish that may provide for a calm diffuse view of a tablet display while also being relatively fingerprint friendly. For example, a glass-like (e.g., highly polished, etc.) surface may show fingerprints, which may distract from viewing, while a matte finish may hide or not pick up fingerprints as readily. Further, a matte finish may have a higher friction coefficient for contact with a user's hand such that a user does not inadvertently drop a clamshell computer if gripped at a translucent portion. As an example, a finish may provide for sufficient grippability even when there is humidity or moisture. As an example, for one or more reasons, a translucent portion of a display housing can have a matte finish as opposed to a high gloss "wet" looking finish. In such an example, the matte finish may provide some amount of light diffusion while still allowing a user to discern content being rendered to a tablet display, which may, for example, be large font content. For example, consider a tablet computer that renders text in a relatively large font (e.g., greater than 12 point, etc.) for viewing through a translucent material that can diffuse light (e.g., either the material itself and/or due to a coating, a finish, etc.). As shown in the example of FIG. 1, the content rendered is in a relatively large font, which may provide for viewing and understanding by a user even where a matte approach is utilized.

As an example, haze may be utilized to characterize optical properties. For example, consider ASTM D1003-95. Haze is a term that can be used to define cloudiness of a material caused by scattering of light. This effect can be influenced by the presence of elements within a polymer such as pigment particles and additives. Furthermore, the haze value may be affected by the presence of material on a surface. Haze can be a characteristic used when determining suitability of a polymer. Haze can be defined as a percentage of transmission diffuse divided by transmission total. Haze may be measured as the relative percentage of light that is scattered more than 2.5 degrees from a direction of an incident light beam. Materials with haze values greater than 30 percent are considered to be light-diffusing polymers. As an example, a portion of a back side of a display housing can include a haze value greater than approximately 5 percent, greater than approximately 10 percent, or greater than approximately 25 percent which may be considered to be a matte portion that diffuses light while still allowing for discerning content (e.g., text and/or graphics).

As an example, a display may be characterized as a semi-glossy display, which utilizes a matte surface with lesser roughness to provide a smoother appearance, with accompanying lesser diffusion (e.g., a relatively low haze value in a range of approximately 13 percent to approximately 18 percent; whereas a very low haze may be approximately 1 percent to approximately 5 percent). A very low haze approach can retain the "wet" look of a fully glossy display (e.g., as ambient light strikes the surface), though with reduced reflection, particularly under dimmer conditions where reflections that might remain bothersome on a fully glossy display tend to be muted, tending to become blended into rendered content. As explained, as an example, a portion of a back side of a display housing can have a percentage of haze that provides for a non "wet" look and diffusion of light.

As an example, the display housing 240 can include a shell, which may be a coated shell, a laminated shell, etc. For example, consider a shell that is formed of a translucent material where a portion of the translucent material is coated with a material that is opaque such that a portion of the shell is not translucent and a portion of the shell is translucent. As to a laminated shell, consider a material that is opaque that is positioned to one or both sides of a translucent material to form a laminated shell that includes a portion of the laminated shell that is opaque and a portion of the laminated shell that is translucent. As an example, a shell may be translucent as made from a translucent material where the translucent material overlays the tablet computer recess 270, which may define a wall of the tablet computer recess 270. Where a shell is translucent, various interior components of the display housing 240 may be visible from the back side 243 of the display housing 240.

The system 100 can include a laptop as the clamshell computer 200 with a removable display device as the tablet computer 300 being removably housable in a transmissive pocket as the tablet computer recess 270 of the display housing 240 (e.g., an A-cover).

The system 100 may provide a solution for a user that desires a clamshell computer and a tablet computer, which normally are separate and not physically combinable. The system 100 can allow for transport of two devices that can be physically combinable and physically separable. In a separated state, the clamshell computer 200 can be operable with its own display and the tablet computer 300 can be operable with its own display; and, in a combined state, the clamshell computer 200 can be operable with its own display and the tablet computer 300 can be in an operational state that may provide for rendering of information to its display 340 where such information is viewable via the back side 243 of the display housing 240 of the clamshell computer 200. As an example, in a closed clamshell orientation of the clamshell computer 200, the tablet computer 300 can be in an operational state that can render information to its display 340 where such information can be viewable via the back side 243 of the display housing 240 of the clamshell computer 200. In such an operational state, the information may be rendered continuously, for a period of time, responsive to one or more events, etc.

As an example, the translucent surface 247 of the display housing 240 of the clamshell computer 200 may be a touch sensitive surface where, for example, a touch can be received as input where such input may instruct the clamshell computer 200 and/or may instruct the tablet computer 300. As an example, as a touch sensitive surface, it may be a "pass through" surface where the display 340 is a touch sensitive display with a range that can detect a touch to the translucent surface 247.

As an example, the display 340 may render one or more graphical controls, for example, as one or more graphical user interfaces (GUIs). In such an example, a GUI may be for instructing the clamshell computer 200 and/or for instruction the tablet computer 300. As an example, a touch received as input may instruct the tablet computer 300 to communicate an instruction to the clamshell computer 200. For example, consider a shut down graphic that may cause issuance of an instruction to the tablet computer 300 that causes transmission of an instruction to shut down the clamshell computer 200, which may also provide for shutting down the tablet computer 300 and/or transitioning the tablet computer 200 to a low power state, etc. (e.g., to be in a state that may be listening for network activity and rendering information to the display 340 responsive to detection of certain network activity such as an email, a call, a message, an alarm, etc.).

As explained, the system 100 can provide for storage, transportation, charging, etc., of two separable devices. As an example, each of the devices 200 and 300 can include an associated operating system, which may be of a common type or may be of different types. For example, consider the operating system of the clamshell computer 200 being more complex (e.g., a MICROSOFT WINDOWS OS, an APPLE MAC OS, etc.) than the operating system of the tablet computer 300 (e.g., a net OS, a CHROME OS, etc.). As to processing and memory resources, the clamshell computer 200 may include more capable resources than the tablet computer 300. As an example, the tablet computer 300 may include circuitry that allows it to operate as an extended display, a mobile display, a remote desktop, etc., of the clamshell computer 200. As an example, applications may be installed in the clamshell computer 200 and similar or different applications may be installed in the tablet computer 300.

In the example of FIG. 1, as mentioned, the display housing 240 can be defined by an area and the tablet computer 300 can be defined by an area that is less than the area of the display housing 240. In such an example, the display 340 can be of a lesser area than a dedicated display of the display housing 240 as viewable via the display side 241. While various clamshell computers provide for a tablet orientation, the footprint (e.g., area, size, etc.) does not change, which can be true for a clamshell computer where a display housing is separable from a keyboard housing. In such examples, a user may make a compromise as to size of a so-called convertible clamshell computer where the user may select a smaller size such that the tablet configuration is not too big; whereas, the system 100 of FIG. 1 allows a user to select a desired display size of the clamshell computer 200 where a display size of the tablet computer 300 is less and the footprint of the tablet computer 300 is less than the footprint of the clamshell computer 200. In such an example, a user may remove the tablet computer 300 from the display housing 240 to have a smaller, more mobile computing device (e.g., for attending meetings, traveling, doing some types of work at home, etc.). For example, where a user desires access to work emails without having to carry around the clamshell computer 200, the user may carry around the tablet computer 300.

As explained, the system 100 can be a mixed form-factor system, with the clamshell computer 200 having a clamshell form-factor and the tablet computer 300 having a tablet form-factor, optionally with a thin keyboard, which may be detachable from the tablet computer 300 and storable in the tablet computer recess 270. As to mass, the tablet computer 300 may be less than 50 percent of a mass of the clamshell computer 200. As an example, the tablet computer 300 may have a mass that is less than 30 percent of a mass of the clamshell computer 200.

As an example, the system 100 can include a clamshell form-factor device that houses a touch sensing and optionally stylus enabled removable display device within a transmissive pocket in a display housing of the clamshell form-factor device.

As explained, the removable display device can be docked in the clamshell device (e.g., a host device) and, as desired, slid out and used, for example, either simultaneously with the host device or independently. As an example, one or more types of interfaces may provide for operatively coupling the clamshell device and the removable display device. For example, wired and/or wireless circuitry. As to wired circuitry consider a serial bus interface such as a USB (e.g., USB-C, etc.) interface, which may provide for transmission of data, power or data and power. As to wireless circuitry, consider, for example, one or more of WiFi, Bluetooth, LiFi, Qi, etc., for transmission of one or more of data and power. As to a wired interface, consider, for example, a tablet computer recess that can include a male connector and a tablet computer that can include a female connector such that the tablet computer does not have an exposed, extended connector and such that the male connector is disposed within the tablet computer recess such that it is unlikely to be distracting, caught on some object, etc.

As an example, a tablet computer may include two interfaces such as, for example, two USB interfaces where one may be on one edge and the other on another edge. In such an example, one may be connectable with an interface of a recess and the other may be exposed when the tablet computer is disposed in the recess. For example, the exposed interface may be accessible when the tablet computer is in a stored state such that data, power or data and power may be transmitted to and/or from the tablet computer.

As an example, each of the devices can include dedicated power and compute resources. As an example, a host device can include various features of a laptop with a hardware keyboard, a friction hinge, and a relatively large display (e.g., 11 inch diagonal to 17 inch diagonal).

As explained with respect to the example of FIG. 1, the recess 270 can be enclosed with a transmissive panel that, when back-lit, can display content from rendered to the display 340. As explained, the recess 270 can provide for charging the tablet computer 300. As an example, wireless charging circuitry can be disposed in the keyboard housing 220 such that where the clamshell computer 200 is in a closed clamshell orientation the tablet computer 300 is brought into proximity to the wireless charging circuitry for purposes of charging a rechargeable battery or batteries thereof. In such an example, the display housing 240 may be thinner than if the wireless charging circuitry were disposed in the display housing 240. In such an example, the keyboard housing 220 may include a palm rest portion (e.g., between a front edge and the keyboard 224) that includes a first antenna where a second antenna is disposed in the tablet computer 300 that can be aligned with the first antenna when the clamshell computer 200 is in a closed orientation.

As explained, the display housing 240 can provide for storage and transport of the tablet computer 300. Such an approach can help to protect the tablet computer 300 from damage. For example, the back side 243 can protect the display 340 from detrimental physical contact with objects, etc. In such an approach, lifetime of the clamshell computer 200 and lifetime of the tablet computer 300 may be extended, for example, when compared to a convertible type of device. A user may carry around the clamshell computer 200 less given that the tablet computer 300 is available. And, when the tablet computer 300 is not removed, it can be securely and safely stored in the recess 270.

As an example, the system 100 may be utilized in a workplace where the tablet computer 300 can be carried to a meeting room while optionally be in communication with the clamshell computer 200 via a wireless network or networks. For example, consider remote desktop mode of operation. Such a wireless connection may be via one or more types of technologies (e.g., WiFi, Bluetooth, proprietary, etc.).

As mentioned, the system 100 may include cellular technology such as one or more cellular network circuits. For example, consider 5G circuitry included in the clamshell computer 200 and/or in the tablet computer 300. Where both include 5G circuitry, such circuitry may be utilized to establish a communication channel, for example, for transfer of data, instructions, etc. As an example, a communication mode may provide for calling of one device by the other device, for example, responsive to removal of the tablet computer 300 from the recess 270. In such an example, a call may be via one or more wireless technologies.

FIG. 2 shows an example of a method for transitioning the system 100 from the orientation shown in FIG. 1 by removing the tablet computer 300 from the tablet computer recess 270. As mentioned, FIG. 2 shows a Cartesian coordinate system $(x_1, y_1, z_1)$ of the keyboard housing 220. As shown, the axis $x_1$ can be utilized to define a width $\Delta x_1$, the axis $y_1$ can be utilized to define a depth $\Delta y_1$, and the axis $z_1$ can be utilized to define a thickness $\Delta z_1$. The dimensions $\Delta x_1$ and $\Delta y_1$ can define an area, for example, a surface area of the keyboard housing 220 (e.g., $a_1 = \Delta x_1 * \Delta y_1$). In the example of FIG. 2, the display housing 240 can be opened to an opening angle $\Phi$ with respect to the keyboard housing 220.

As shown, the tablet computer 300 can be translated outwardly from the display housing 240 and be utilized for rendering information to the display 340 thereof. In the example of FIG. 2, the display housing 240 is shown from its display side 241 as including a display 244 and the tablet computer 300 is shown as including a display side 341 and a back side 343. As explained, in a stored orientation as shown in FIG. 1, the display side 341 is oriented toward the back side 243 of the display housing 240 and the back side 343 is oriented toward the display side 241 of the display housing 240. Such an approach can provide for viewing of content rendered to the display 340 via the translucent portion 247 of the back side 243 of the display housing 240. As an example, the display 340 can be an illuminable display that may be of a controllable brightness where, for example, as brightness increases, rendered content to the display 340 may become more visible through the translucent portion 247.

In the example of FIG. 2, a user may utilize a large portion of the display 244 for an application such as a videoconferencing application where the display 340 may be utilized for rendering of information germane to a videoconference (e.g., meeting agenda, etc.). In such an example, a user can more effectively utilize the display 244 for viewing one or more videoconferencing attendees. Further, a user may maintain a camera 249 of the clamshell computer 200 in a particular position without interference through use of the keyboard 224 of the keyboard housing 240, etc. For example, a user may sit at an appropriate distance that provides for an optimal video stream field of view of the user via the camera 249 while manipulating the tablet computer 300 for purposes of taking notes, sharing documents, etc. In such an example, the user may bring the tablet computer 300 closer to his face to look at content of a document rendered to the display 340 without having to adjust the clamshell computer 200, which may cause an undesirable change in the field of view of the camera 249 (e.g., a webcam, etc.).

As an example, a videoconferencing application may provide for camera switching, for example, switching between the camera 249 and a camera 349 of the tablet computer 300. As an example, a composite of content may be rendered to the display 244 where, for example, some of the content is rendered to the display 340 and/or is captured via the camera 349. As an example, where a user desires showing a videoconferencing attendee something within the user's environment, the user may point the camera 349 at an object, a scene, etc., such that the captured image or images may be streamed to the videoconferencing attendee, without the user having to disturb the position of the camera 249. As an example, the tablet computer 300 may include a front facing and/or a back facing camera.

FIG. 2 also shows wireless charging circuitry 280 and 380, which may be utilized for charging a rechargeable battery of the tablet computer 300. For example, when the opening angle Φ is approximately zero (e.g., a closed clamshell computer orientation), the display side 241 can be proximate to the keyboard 224 key faces and the wireless charging circuitry 380 can be proximate to the wireless charging circuitry 280 (e.g., within a centimeter, etc.) such that energy can be transferred.

The example of FIG. 2 shows the open end 273 of the recess 270 of the display housing 270, noting that an opening may be on another edge. For example, consider a top edge open end such that the tablet computer 300 can be removed via a top edge of the display housing 240.

Figure 3:
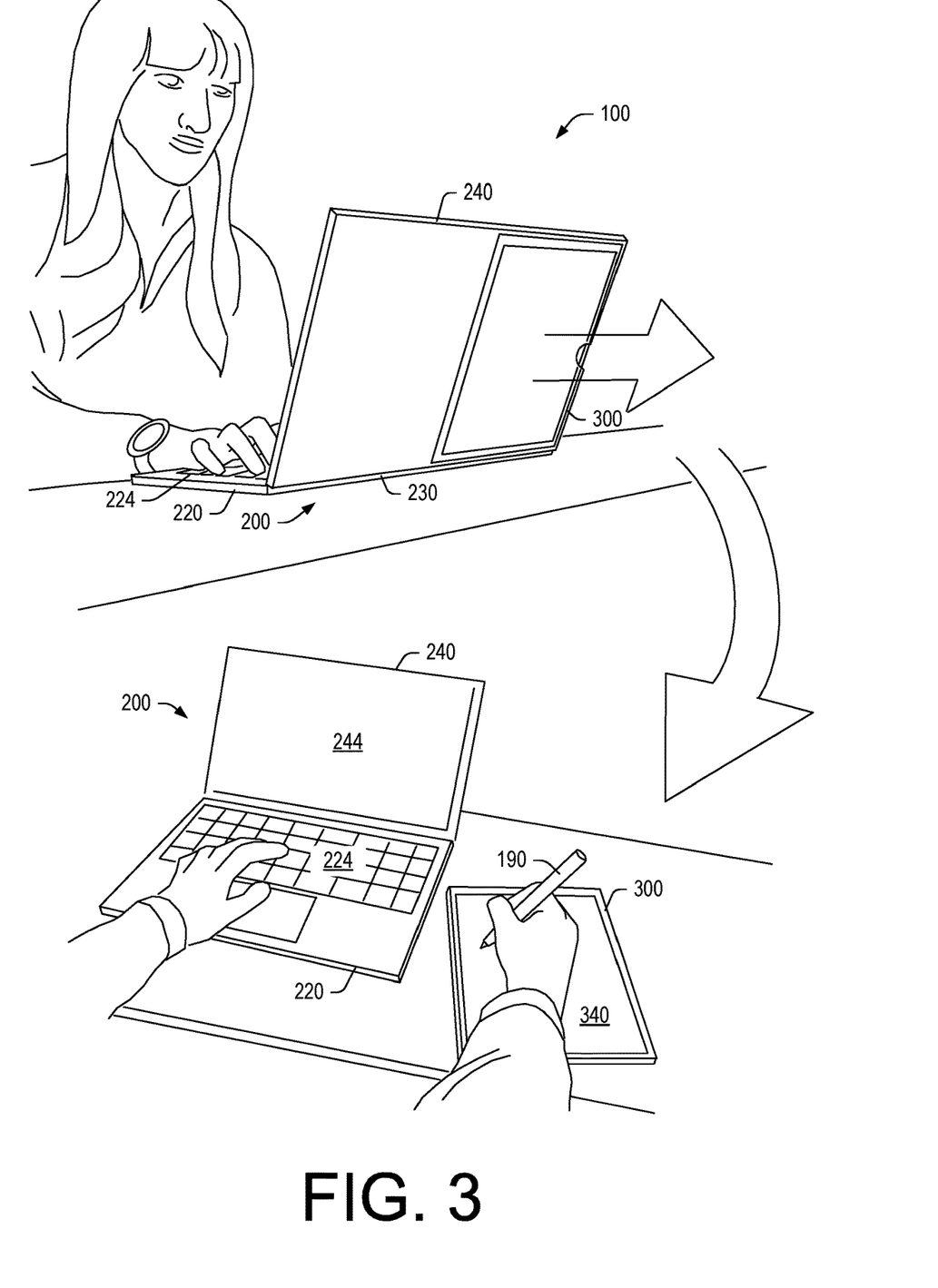
FIG. 3 is a diagram of an example of a method and an example of a system.

FIG. 3 shows an example of a method of using the system 100 of FIG. 1. As shown, a user can type on the keyboard 244 of the keyboard housing 240 of the clamshell computer 200 and then remove the tablet computer 300 for use as a tablet with a stylus 190. As an example, the system 100 can include a stylus dock, which may be part of the clamshell computer 200 and/or the tablet computer 300. As an example, the display 340 may be a digitizer display that utilized one or more types of digitization circuitry that may receive input through use of an active and/or a passive stylus.

Figure 4:
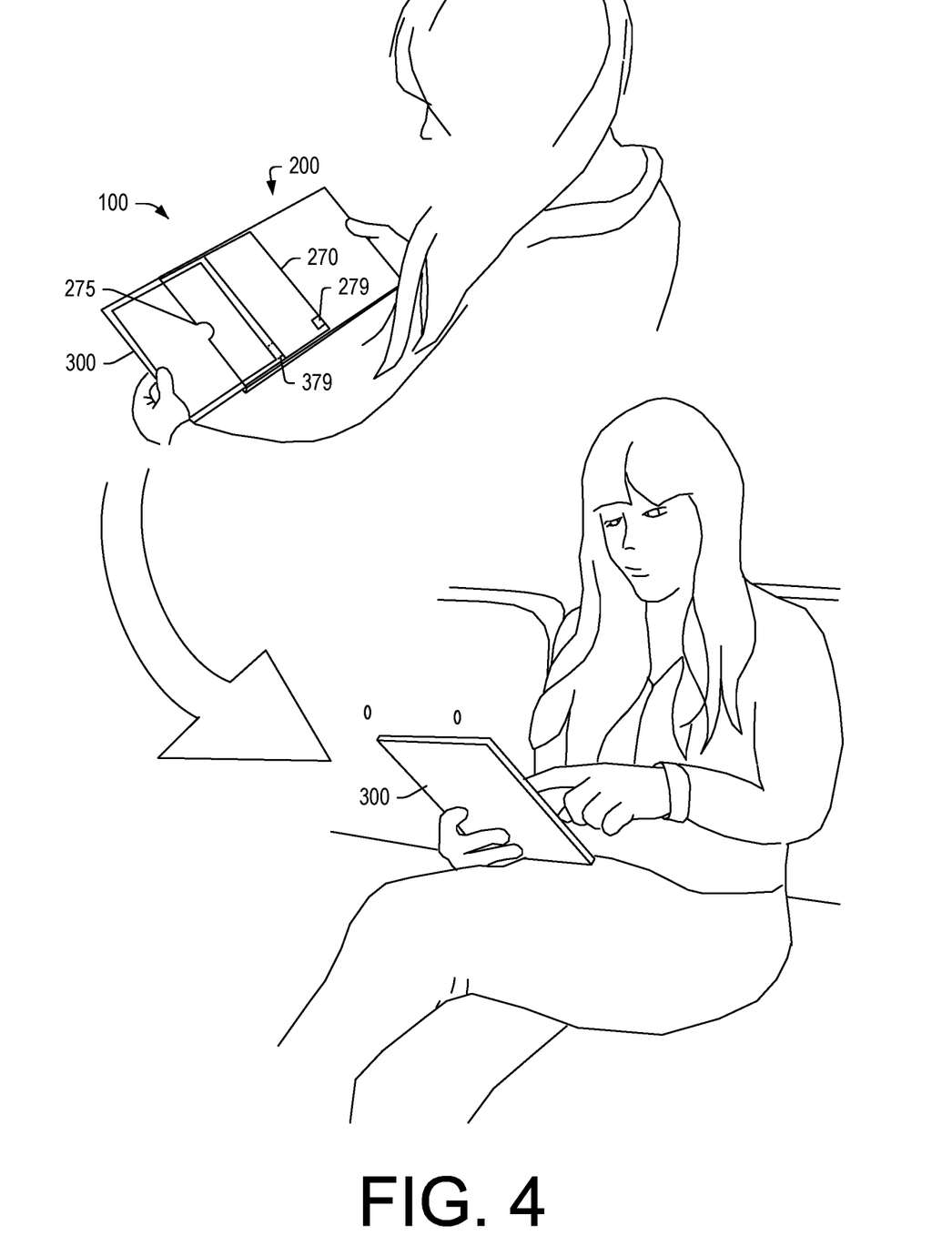
FIG. 4 is a diagram of an example of a method and an example of the system.

FIG. 4 shows an example of a method of using the system 100 of FIG. 1. As shown, the clamshell computer 200 can be in a closed clamshell orientation where a user can remove the tablet computer 300 from the recess 270, for example, utilizing an access feature 275 (e.g., a notch, a cutout, etc.). In the example of FIG. 4, the user can utilize the tablet computer 300, for example, for rendering of content (e.g., emails, messages, social media, etc.), browsing the Internet, etc.

In the example of FIG. 4, the recess 270 is shown as including a male connector 279 while the tablet computer 300 is shown as including a female connector 379, which can be operatively coupled to the male connector 279. As an example, physical connectors may provide for some amount of frictional force that can help to retain a tablet computer in a recess, particularly where an opening of the recess may be pointing downwardly (e.g., to reduce risk of the tablet computer inadvertently sliding out of the recess). As mentioned, a tablet computer may include more than one connector, which may be on an opposing edge such that it is accessible when the tablet computer is received in a recess (e.g., in a stored state). As an example, multiple connectors may be operatively coupled, for example, with common driver circuitry, etc. For example, an exposed connector may be operatively coupled to an unexposed connector where, for example, access to a clamshell computer is possible via the exposed connector. In such an example, the connectors may be USB-C connectors where a user can access data and/or power of the clamshell computer and/or the tablet computer via the exposed connector. For example, consider coupling a third device to the tablet computer via the exposed connector and accessing power and/or data of the clamshell computer and/or accessing power and/or data of the tablet computer.

Figure 5:
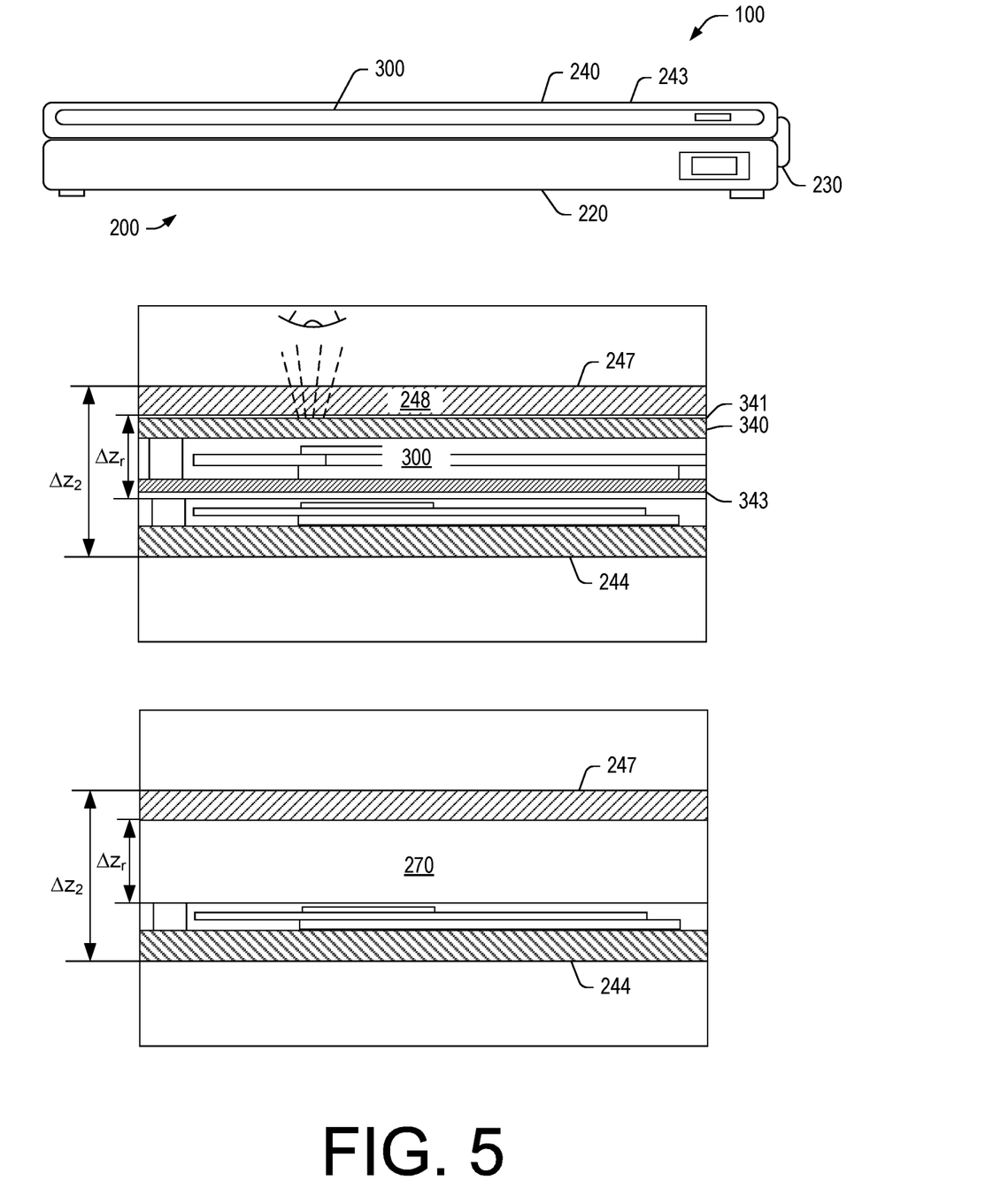
FIG. 5 is a series of diagrams of an example of a system.

FIG. 5 shows an example of a side view of the system 100 with the tablet computer 300 received in the recess 270 of the display housing 240, an example of an approximate cross-sectional view of the system 100 with the tablet computer 300 received in the recess 270 of the display housing 240, and an example of an approximate cross-sectional view of the clamshell computer 200 without the tablet computer 300 received in the recess 270 of the display housing 240. As shown, the tablet computer 300 can include various components (e.g., circuitry, etc.) disposed therein and the clamshell computer 200 can include various components (e.g., circuitry, etc.) disposed in the display housing 240.

In the example of FIG. 5, the translucent surface 247 can be formed using a translucent material 248, which may be one or more materials (e.g., laminated, etc.). As shown, the display 340 of the tablet computer 300 can be adjacent the translucent material 248 such that illumination of the display 340 can backlight the translucent material 248 such that content is visible to the human eye from the back side 243 of the display housing 240. As an example, the translucent material 248 can include one or more circuits disposed therein, disposed thereon, etc., which may include touch circuitry such that touch input (e.g., via a finger, a stylus, etc.) may be received. As mentioned, a translucent material can be "touch transparent" such that a touch can be received via touch sensing circuitry of the tablet computer 300 (e.g., as associated with the display 340).

As to examples of touch technology, consider projected capacitive and surface capacitive. Projected capacitive (PCap) touch technology finds use on various displays of smartphones and tablets. PCap technology can include a layer of glass, a matrix of electrodes and a protective film. In such an example, the matrix of electrodes can create a three dimensional electrostatic field that registers a change in electrical current such that, when a conductive object, such as a finger or a stylus, comes into proximity with the matrix of electrodes, the electric field is changed, and the circuitry can register the object (e.g., time, space, etc.).

Surface capacitive technology can include a layer of glass, a layer of electrodes, and a protective film. For example, a layer of electrodes can be regulated with a relatively constant charge and when an object comes into proximity to the protective film (e.g., a bare finger or a capacitive stylus), an amount of the charge (e.g., or electric current) can be transferred to the object. Sensors can locate where the charge (e.g., electric current) is transferred to register the object (e.g., time, space, etc.).

As to another example of touch technology, consider resistive touch technology. Resistive type touch technology can include a panel of glass and protective film screen that are separated by a small gap (e.g., an air gap). In such an example, the sides of the glass and film that face each other can be coated with a thin metallic layer of electrodes. Where pressure is applied to the film (e.g., via touch force), the two electrode layers can contact each other thereby completing an electrical circuit and registering the touch. As an example, spacer dots can be utilized to locate a touch point. Various types of objects can be utilized on a resistive touch surface. For example, even where a user is wearing thick gloves, touch may be registered.

As an example, if the tablet computer 300 has resistive touch circuitry, the translucent material 248 may be resilient in that it may be depressed to transfer force to the surface 341 of the tablet computer 300 to register a touch by the resistive touch circuitry of the tablet computer. As an example, the translucent material 248 may include stiff regions and a less stiff, resilient region, which may be utilized for touch input. In such an example, inadvertent touches may be reduced while a graphical user interface (GUI) may be rendered to the display 340 of the tablet computer 300 in the particular less stiff, resilient region for registering touch input. In such an example, the less stiff, resilient region may be a thinner region of the translucent material 248 that is formed, machined, etc., to be thinner to make it more resilient. For example, where a GUI renders one or more buttons, etc., in a regular position that matches the resilient region, a user may press down to apply force in the resilient region to register a touch by the tablet computer 300.

As an example, if the tablet computer 300 has capacitive touch circuitry, the translucent material 248 can be of properties that provide for capacitive touch registration. Where a glass material is utilized, in general, a thicker material results in poorer quality touch registration. As an example, a translucent material thickness may be in a range from 0.5 mm to 15 mm; noting that circuitry may demand higher sensitivity (e.g., hardware and/or software) if thickness is greater than approximately 7 mm.

As an example, consider the display 340 of the tablet computer 300 as having a layer with a first thickness and the translucent material 248 as having a second thickness. Where the layer and the translucent material 248 are in close proximity, optionally touching (e.g., in contact), and where the combined thickness is less than approximately 10 mm, touch may be registered using capacitive touch technology. As an example, a translucent material 248 can have resiliency within one or more regions where, responsive to applied force, the resiliency decreases a distance between the translucent material and a display such that capacitive touch can be registered by capacitive touch circuitry of the display. As explained, resiliency may be in a region that corresponds to a region where one or more graphics (e.g., GUIs) can be rendered to the display.

As an example, for a finger applied force, an example translucent material can include a region with a resiliency that can provide for displacement of a surface of translucent material by a distance of approximately 0.1 mm to approximately 5 mm. As an example, a force may be compared to a touch-typing force where a user may, for example, apply a force of approximately 2.5 N (e.g., mass of approximately 260 g), which may be in excess of a minimum key actuation force (e.g., consider 0.47 N, e.g., a mass of approximately 48 g). A user may be accustomed to such force through touch-typing, which can be acceptable for a "through a housing" approach to touch registration. As an example, where an applied force approach is utilized that includes translucent material deformation, the applied force can be greater than a force of a resistive touch display of a tablet computer as the translucent material may add an additional physical resistance for registering touch of the resistive touch display (e.g., physical resistance in series).

As an example, a recess of a display housing can include a spring-biased mechanism that can provide for close proximity or contact between an inner surface of a translucent material and an outer surface of a display of a tablet computer. In such an example, an unlatching mechanism may release the spring-bias such that a distance increases such that movement of the tablet computer does not cause undesirable moving contact between the surfaces, which may cause wear to one or both of the surfaces.

As an example, capacitive touch technology can be operable with an air gap, which may exist between a surface such as an inner surface of the translucent material 248 and an outer surface of the display 340. In such an example, the air gap may be greater than 0 mm and less than or equal to approximately 2 mm. As an example, a display housing can include a tablet computer recess that can receive a tablet computer in a manner that positions a display of the tablet computer a distance from a surface of a translucent material where the distance may be less than or equal to approximately 2 mm.

As mentioned, a display housing can include touch sensitive circuitry that can register touch and via one or more interfaces cause transmission of a signal to a tablet computer to cause the tablet computer to take an action. For example, touch circuitry may be positioned adjacent to the translucent material where the touch circuitry may be translucent or otherwise provide for a screen door effect (e.g., minimal impact on rendered content) where upon registration of a touch, the touch circuitry can generate a signal that is communicated via a wired and/or a wireless interface to the tablet computer. Where wireless interface technology is utilized, communication may optionally occur where the tablet computer is not received in a tablet computer recess.

As an example, the tablet computer 300 may include two displays where regardless of orientation in the recess 270, one of the displays is viewable via translucent material of the display housing 240. In such an example, the tablet computer 300 may detect its orientation such that the proper display can be illuminated for backlighting the translucent material.

As an example, the tablet computer 300 can include a camera, an ambient light sensor, etc., which may be able to determine if a display is facing a translucent material of a display housing with the tablet computer 300 received in a recess of a display housing of a clamshell computer. For example, if ambient light shines through the translucent material to reach the camera, the ambient light sensor, etc., the tablet computer 300 can determine whether the display 340 is facing outwardly and visible via the translucent material (e.g., upon backlighting, etc.). In such an example, a sensor (e.g. a camera, ambient light sensor, etc.) may be on one side or another (e.g., or sensors on both sides) where logic can be utilized to determine orientation of the tablet computer 300 in a recess. If the camera is on a back side, if no light is received, a determination may be made that the display is facing translucent material and, in contrast, if light is received, then a determination may be made that the display is not facing translucent material; whereas, if the camera is on the same side as the display and it receives light, then a determination may be made that the display is facing translucent material and, in contrast, if light is not received, a determination may be made that the display is not facing translucent material.

As an example, where a user desires security in the sense of privacy, the user may orient a tablet computer with a display facing away from translucent material of a display housing of a recess of a clamshell computer.

As an example, a tablet computer can include an accelerometer that can determine an appropriate orientation of content to be rendered to a display. As an example, a clamshell computer can include an accelerometer that can determine an appropriate orientation of content to be rendered to a display of a tablet computer received in a recess of a display housing of the clamshell computer.

As an example, a system can include one or more security mechanisms. For example, consider a leash that depends on communication or sensing between the clamshell computer 200 and the tablet computer 300. In such an example, where a leash is lost, one or both of the computers 200 and 300 may enter a secure state. For example, consider the clamshell computer 200 going to a lower power state (e.g., sleep, power down, etc.) that demands entry of a credential to transition to a higher power state. Such an approach can provide an indication that a user may have the tablet computer 300 may not be returning soon or may be at a large distance from the clamshell computer 200 (e.g., not within the user's view, etc.). As an example, where the tablet computer 300 includes a camera, a face recognition may be utilized for one or more purposes. For example, consider utilizing camera-based face recognition for making a remote desktop connection to the clamshell computer. As an example, a system can include one or more fingerprint readers and/or one or more other biometric readers.

As an example, a system can include a tablet computer that includes a tablet display; and a clamshell computer that includes a keyboard housing, a display housing and a hinge assembly that rotatably couples the keyboard housing and the display housing, where the display housing includes a display viewable via a display side, an opposing back side, and a tablet computer recess disposed between the display side and the back side that removably receives the tablet computer. In such an example, the back side of the display housing can include a translucent material, for example, consider a translucent material that is less than 99.999 percent transparent.

As an example, a system can include a tablet computer in a stored state that illuminates a tablet display to backlight at least a portion of a translucent material of a back side of a display housing of a clamshell computer. In such an example, the stored state can be or be associated with a low power state. For example, consider a tablet computer that includes state circuitry that transitions the tablet computer to a low power state responsive to a transition of a clamshell computer from an open clamshell orientation to a closed clamshell orientation. As an example, in a stored state of a tablet computer, power circuitry of a clamshell computer can be operatively coupled to power circuitry of the tablet computer. In such an example, where the clamshell computer is plugged-in to a power source (e.g., a wall outlet, etc.), or otherwise instructed, it may provide for charging a rechargeable battery of the tablet computer.

As an example, a system can include touch input circuitry, where, in a stored state of a tablet computer in a tablet computer recess of a clamshell computer, the tablet computer is instructable via the touch input circuitry. For example, consider a scenario where, in the stored state, the touch input circuitry responds to touch input received via a back side of a display housing of the clamshell computer. In such an example, the back side can include a translucent material where the touch input circuitry responds to touch input received via the translucent material. As an example, a tablet computer can include touch input circuitry and/or a clamshell computer can include touch input circuitry.

As an example, a display area of a tablet display of a tablet computer can be less than a display area of a display of a display housing of a clamshell computer that includes a recess for storing the tablet computer. In such an example, the display area of the tablet display can be less than 70 percent of the display area of the display of the display housing.

As an example, a tablet computer can be translatably removable from a tablet computer recess of a display housing of a clamshell computer.

As an example, a tablet computer can include a rectangular frame defined by four edges where a tablet computer recess of a display housing of a clamshell computer includes an edge guide or edge guides. As an example, in a stored state of the tablet computer in the tablet computer recess, an edge guide can contact one of four edges of the tablet computer. As an example, an edge guide can be a first edge guide and where a tablet computer recess includes a second edge guide, where, in a stored state of the tablet computer in the tablet computer recess, the first edge guide contacts a first one of four edges of the tablet computer and the second edge guide contacts a second one of the four edges of the table computer.

As an example, an edge guide or edge guides can provide for force sufficient to maintain the tablet computer in a tablet computer recess such that the tablet computer does not under a force of gravity inadvertently slide out of the tablet computer recess. As an example, a tablet computer recess and/or a tablet computer may provide for a frictional force or a magnetic force to reduce risk of inadvertent sliding.

As an example, a display housing can include an access notch where, in a stored state of a tablet computer in a tablet computer recess of the display housing, a portion of the tablet computer is accessibly exposed via the notch for manual removal of the tablet computer from the tablet computer recess. For example, consider a notch of a size and shape sufficient for access to a tablet computer by a fingertip. As an example, a tablet computer may include a groove that can receive a portion of a fingernail such that the tablet computer can be translated out of a tablet computer recess.

As an example, a clamshell computer can include an operating system executable to establish an operating system environment, where an application executable in the operating system environment can be instructable via wireless receipt of an instruction generated by a tablet computer that can be stored in a tablet computer recess of a display housing of the clamshell computer.

As an example, a system can include security circuitry that responds to a condition of a tablet computer to transition a clamshell computer to a secure state. For example, consider a proximity-based condition of the tablet computer with respect to the clamshell computer. As an example, security circuitry can respond to a condition of a clamshell computer to transition a tablet computer to a usable state. For example, consider a condition such as a logon condition.

As an example, a clamshell computer can include a file system where, for example, the file system is accessible via wireless circuitry of a tablet computer that can be stored in a tablet computer recess of the clamshell computer.

As an example, a tablet computer can include multiple modes such as a coupled mode and an independent mode. In such an example, the coupled mode can include a remote control mode where, for example, the remote control mode is a remote desktop mode.

As an example, a clamshell computer can include a keyboard housing that includes a wireless battery charger, where a tablet computer can include wireless battery charging circuitry, and where, in a closed clamshell orientation of the clamshell computer with the tablet computer received in a tablet computer recess of a display housing of the clamshell computer, the wireless battery charging circuitry aligns with the wireless battery charger for charging of a rechargeable battery of the tablet computer.

As an example, a clamshell computer can include a tablet computer recess that includes a side opening, a top opening or a side opening and a top opening.

As an example, a system can include at least one magnet where, in a stored state of a tablet computer in a tablet computer recess of a clamshell computer, a magnetic force can secure the tablet computer in the tablet computer recess. In such an example, the magnetic force may be greater than a gravity force of the mass of the tablet computer such that the tablet computer does not slide out of the tablet computer recess when an opening of the tablet computer recess is pointed downward.

As an example, a system can include at least one friction guide where, in a stored state of a tablet computer in a tablet computer recess of a clamshell computer, a friction force secures the tablet computer. In such an example, the friction force may be greater than a gravity force of the mass of the tablet computer such that the tablet computer does not slide out of the tablet computer recess when an opening of the tablet computer recess is pointed downward. As an example, a system may utilize a combination of friction and magnetic forces to secure a tablet computer.

As an example, a mass of a tablet computer of a system can be less than fifty percent of a mass of a clamshell computer of the system.

As an example, a tablet computer can include wireless communication circuitry that calls for illuminating a tablet display of the tablet computer responsive to receipt of a wireless communication. For example, consider receipt of a message, a call, an alarm, etc. In such examples, the tablet display may illuminate to backlight a translucent material portion of a clamshell computer tablet computer recess to inform a user.

As an example, a tablet computer may include two displays. For example, consider a front display and a back display where circuitry may respond to orientation of the tablet computer in a tablet computer recess of a clamshell computer to determine which of the two displays is to be utilized in a stored state of the tablet computer in the tablet computer recess of the clamshell computer.

The term "circuit" or "circuitry" is used in the summary, description, and/or claims. As is well known in the art, the term "circuitry" includes all levels of available integration (e.g., from discrete logic circuits to the highest level of circuit integration such as VLSI, and includes programmable logic components programmed to perform the functions of an embodiment as well as general-purpose or special-purpose processors programmed with instructions to perform those functions) that includes at least one physical component such as at least one piece of hardware. A processor can be circuitry. Memory can be circuitry. Circuitry may be processor-based, processor accessible, operatively coupled to a processor, etc. Circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium, which is non-transitory and not a signal or a carrier wave.

Figure 6:
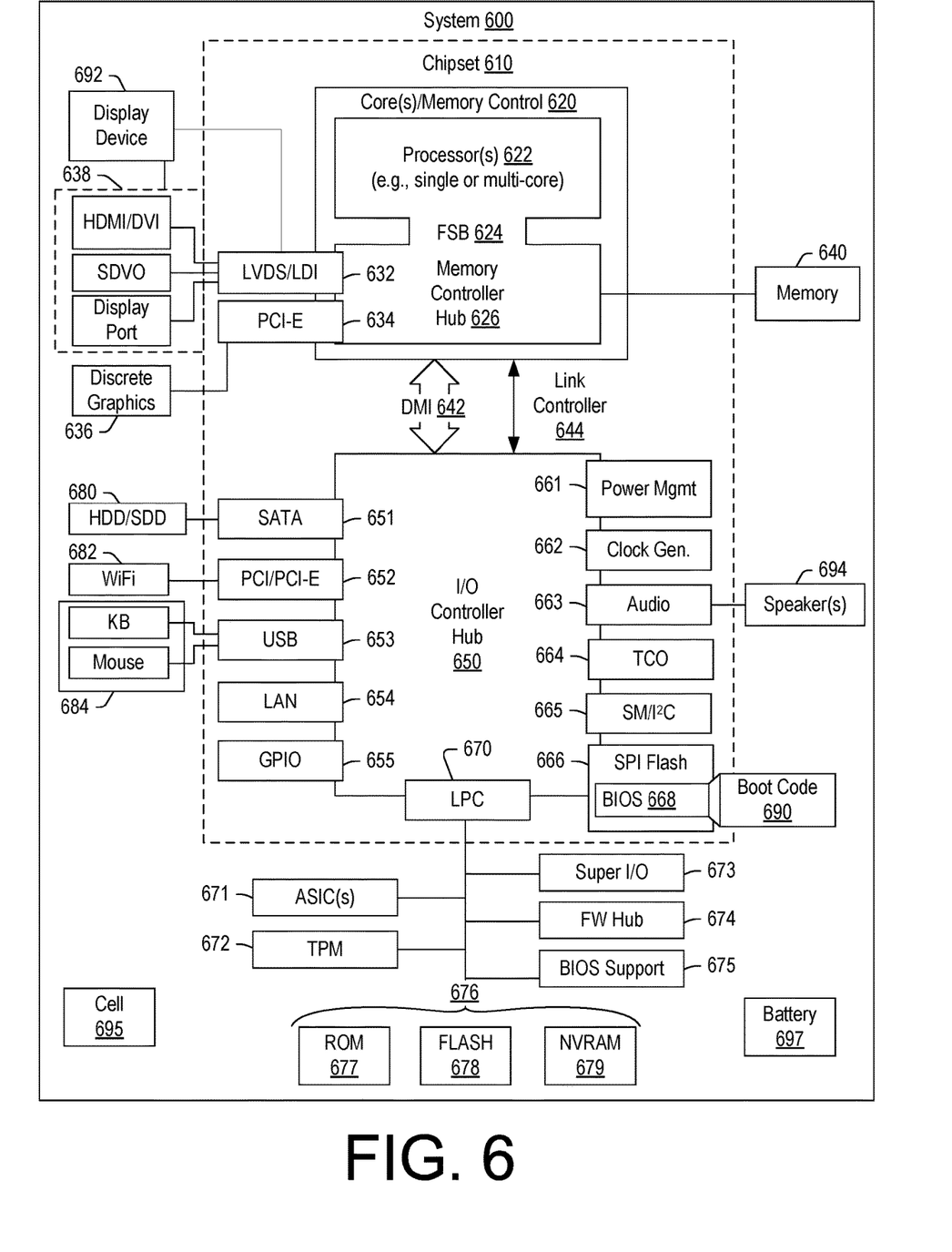
FIG. 6 is a diagram of an example of a system that includes one or more processors.

While various examples of circuits or circuitry have been discussed, FIG. 6 depicts a block diagram of an illustrative computer system 600. The system 600 may be a computer system, such as one of the ThinkCentre® or ThinkPad® series of personal computers sold by Lenovo (US) Inc. of Morrisville, N.C., or a workstation computer system, such as the ThinkStation®, which are sold by Lenovo (US) Inc. of Morrisville, N.C.; however, as apparent from the description herein, a system or other machine may include other features or only some of the features of the system 600. As an example, a system such as the system 100 of FIG. 1 may include at least some of the features of the system 600.

As shown in FIG. 6, the system 600 includes a so-called chipset 610. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 6, the chipset 610 has a particular architecture, which may vary to some extent depending on brand or manufacturer. The architecture of the chipset 610 includes a core and memory control group 620 and an I/O controller hub 650 that exchange information (e.g., data, signals, commands, etc.) via, for example, a direct management interface or direct media interface (DMI) 642 or a link controller 644. In the example of FIG. 6, the DMI 642 is a chip-to-chip interface (sometimes referred to as being a link between a "northbridge" and a "southbridge").

The core and memory control group 620 include one or more processors 622 (e.g., single core or multi-core) and a memory controller hub 626 that exchange information via a front side bus (FSB) 624. As described herein, various components of the core and memory control group 620 may be integrated onto a single processor die, for example, to make a chip that supplants the conventional "northbridge" style architecture.

The memory controller hub 626 interfaces with memory 640. For example, the memory controller hub 626 may provide support for DDR SDRAM memory (e.g., DDR, DDR2, DDR3, etc.). In general, the memory 640 is a type of random-access memory (RAM). It is often referred to as "system memory".

The memory controller hub 626 further includes a low-voltage differential signaling interface (LVDS) 632. The LVDS 632 may be a so-called LVDS Display Interface (LDI) for support of a display device 692 (e.g., a CRT, a flat panel, a projector, etc.). A block 638 includes some examples of technologies that may be supported via the LVDS interface 632 (e.g., serial digital video, HDMI/DVI, display port). The memory controller hub 626 also includes one or more PCI-express interfaces (PCI-E) 634, for example, for support of discrete graphics 636. Discrete graphics using a PCI-E interface has become an alternative approach to an accelerated graphics port (AGP). For example, the memory controller hub 626 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 650 includes a variety of interfaces. The example of FIG. 6 includes a SATA interface 651, one or more PCI-E interfaces 652 (optionally one or more legacy PCI interfaces), one or more USB interfaces 653, a LAN interface 654 (more generally a network interface), a general purpose I/O interface (GPIO) 655, a low-pin count (LPC) interface 670, a power management interface 661, a clock generator interface 662, an audio interface 663 (e.g., for speakers 694), a total cost of operation (TCO) interface 664, a system management bus interface (e.g., a multi-master serial computer bus interface) 665, and a serial peripheral flash memory/controller interface (SPI Flash) 666, which, in the example of FIG. 6, includes BIOS 668 and boot code 690. With respect to network connections, the I/O hub controller 650 may include integrated gigabit Ethernet controller lines multiplexed with a PCI-E interface port. Other network features may operate independent of a PCI-E interface.

The interfaces of the I/O hub controller 650 provide for communication with various devices, networks, etc. For example, the SATA interface 651 provides for reading, writing or reading and writing information on one or more drives 680 such as HDDs, SDDs or a combination thereof. The I/O hub controller 650 may also include an advanced host controller interface (AHCI) to support one or more drives 680. The PCI-E interface 652 allows for wireless connections 682 to devices, networks, etc. The USB interface 653 provides for input devices 684 such as keyboards (KB), one or more optical sensors, mice and various other devices (e.g., microphones, cameras, phones, storage, media players, etc.). On or more other types of sensors may optionally rely on the USB interface 653 or another interface (e.g., I²C, etc.). As to microphones, the system 600 of FIG. 6 may include hardware (e.g., audio card) appropriately configured for receipt of sound (e.g., user voice, ambient sound, etc.).

In the example of FIG. 6, the LPC interface 670 provides for use of one or more ASICs 671, a trusted platform module (TPM) 672, a super I/O 673, a firmware hub 674, BIOS support 675 as well as various types of memory 676 such as ROM 677, Flash 678, and non-volatile RAM (NVRAM) 679. With respect to the TPM 672, this module may be in the form of a chip that can be used to authenticate software and hardware devices. For example, a TPM may be capable of performing platform authentication and may be used to verify that a system seeking access is the expected system.

The system 600, upon power on, may be configured to execute boot code 690 for the BIOS 668, as stored within the SPI Flash 666, and thereafter processes data under the control of one or more operating systems and application software (e.g., stored in system memory 640). An operating system may be stored in any of a variety of locations and accessed, for example, according to instructions of the BIOS 668. Again, as described herein, a satellite, a base, a server or other machine may include fewer or more features than shown in the system 600 of FIG. 6. Further, the system 600 of FIG. 6 is shown as optionally include cell phone circuitry 695, which may include GSM, CDMA, etc., types of circuitry configured for coordinated operation with one or more of the other features of the system 600. Also shown in FIG. 6 is battery circuitry 697, which may provide one or more battery, power, etc., associated features (e.g., optionally to instruct one or more other components of the system 600). As an example, a SMBus may be operable via a LPC (see, e.g., the LPC interface 670), via an I²C interface (see, e.g., the SM/I²C interface 665), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising: a tablet computer that comprises a tablet display; and a clamshell computer that comprises a keyboard housing, touch input circuitry, a display housing and a hinge assembly that rotatably couples the keyboard housing and the display housing, wherein the display housing comprises a display viewable via a display side, an opposing back side shell formed at least in part with a translucent material to form a translucent portion, and a tablet computer recess disposed between the display side and the back side shell that removably receives the tablet computer, and wherein, in a stored state of the tablet computer in the tablet computer recess wherein an overlap exists between at least a portion of the tablet display and the translucent portion of the back side shell, the tablet computer is instructable via the touch input circuitry responsive to touch input received via the back side shell of the display housing.

2. The system of claim 1, wherein the tablet computer, in the stored state, illuminates the tablet display to backlight at least a portion of the translucent portion of the back side shell of the display housing of the clamshell computer.

3. The system of claim 2, wherein the stored state comprises a low power state.

4. The system of claim 3, wherein the tablet computer comprises state circuitry that transitions the tablet computer to the low power state responsive to a transition of the clamshell computer from an open clamshell orientation to a closed clamshell orientation.

5. The system of claim 3, wherein, in the stored state, power circuitry of the clamshell computer is operatively coupled to power circuitry of the tablet computer.

6. The system of claim 1, wherein the tablet computer comprises other touch input circuitry.

7. The system of claim 1, wherein a display area of the tablet display is less than a display area of the display of the display housing.

8. The system of claim 1, wherein the tablet computer comprises a rectangular frame defined by four edges and wherein the tablet computer recess comprises an edge guide.

9. The system of claim 1, wherein the display housing comprises an access notch and wherein, in the stored state of the tablet computer in the tablet computer recess, a portion of the tablet computer is accessibly exposed via the notch for manual removal of the tablet computer from the tablet computer recess.

10. The system of claim 1, wherein the clamshell computer comprises an operating system executable to establish an operating system environment, wherein an application executable in the operating system environment is instructable via wireless receipt of an instruction generated by the tablet computer.

11. The system of claim 1, comprising security circuitry that responds to a condition of the tablet computer to transition the clamshell computer to a secure state, wherein the condition comprises a proximity-based condition of the tablet computer with respect to the clamshell computer.

12. The system of claim 1, comprising security circuitry that responds to a condition of the clamshell computer to transition the tablet computer to a usable state.

13. The system of claim 1, wherein the clamshell computer comprises a file system and wherein the file system is accessible via wireless circuitry of the tablet computer.

14. The system of claim 1, wherein the keyboard housing comprises a wireless battery charger, wherein the tablet computer comprises wireless battery charging circuitry, and wherein, in a closed clamshell orientation of the clamshell computer with the tablet computer received in the tablet computer recess, the wireless battery charging circuitry aligns with the wireless battery charger for charging of a rechargeable battery of the tablet computer.

15. The system of claim 1, wherein the tablet computer comprises wireless communication circuitry that calls for illuminating the tablet display responsive to receipt of a wireless communication.

16. The system of claim 1, wherein content rendered to the tablet display of the tablet computer is viewable through the translucent portion of the back side shell of the display housing of the clamshell computer.

17. The system of claim 16, wherein, responsive to the touch input, the tablet computer alters content rendered to the tablet display of the tablet computer that is viewable through the translucent portion of the back side shell of the display housing of the clamshell computer.

18. The system of claim 16, comprising a battery, wherein the content comprises a power level indicator for the battery.

19. A system comprising:
a tablet computer that comprises a tablet display; and
a clamshell computer that comprises a keyboard housing, a display housing and a hinge assembly that rotatably couples the keyboard housing and the display housing, wherein the display housing comprises a display viewable via a display side, an opposing back side, and a tablet computer recess disposed between the display side and the back side that removably receives the tablet computer, wherein the keyboard housing comprises a wireless battery charger, wherein the tablet computer comprises wireless battery charging circuitry, and wherein, in a closed clamshell orientation of the clamshell computer with the tablet computer received in the tablet computer recess, the wireless battery charging circuitry aligns with the wireless battery charger for charging of a rechargeable battery of the tablet computer.

* * * * *